2,730,444
PRODUCTION OF CELLULOSE

Arthur Hodge, John Downing, and James Gordon Napier Drewitt, Spondon, near Derby, England, assignors to British Celanese Limited, a corporation of Great Britain No Drawing. Application September 29, 1951, Serial No. 249,006

Claims priority, application Great Britain October 10, 1950

9 Claims. (Cl. 92—9)

This invention relates to the production of cellulose and lignin from ligno-cellulosic materials such as woods and straws.

According to the invention, ligno-cellulosic materials are heated with a liquid comprising an unsaturated dicarboxylic acid or an anhydride, especially a cyclic anhydride, of an unsaturated dicarboxylic acid, after which the materials are preferably treated with an alkaline solution.

As the acid or anhydride it is preferred to use maleic or fumaric acid or maleic anhydride, but other unsaturated dicarboxylic acids and anhydrides of such acids may be used provided they are stable at the temperature to be employed. Examples of such compounds are chloromaleic acid and its anhydride, glutaconic acid and its anhydride, itaconic acid and its anhydride, citraconic anhydride, dimethyl maleic anhydride and methyl ethyl maleic anhydride.

The unsaturated dicarboxylic acid or anhydride may be employed alone (provided its melting point is below the temperature to be employed in the treatment of the ligno-cellulosic material) but is preferably used in admixture with another compound (hereinafter referred to as a diluent) which is inert with respect to the acid or anhydride at the temperature employed and which may act solely as a diluent or solvent for the acid or anhydride or itself may have some action on the ligno-cellulosic material. Examples of such diluents are water (especially when acids are employed), alcohols, e. g. ethyl, isopropyl and the butyl and amyl alcohols, saturated lower fatty acids, e. g. acetic acid, propionic acid, and butyric acid, and (when an unsaturated anhydride is employed) hydrocarbons and especially aromatic hydrocarbons such as benzene, toluene and the xylenes. Mixtures which have been found to be particularly useful are mixtures of maleic or fumaric acid with water or acetic acid and mixtures of maleic anhydride with acetic acid or one or more aromatic hydrocarbons such as toluene and its near homologues, especially the xylenes.

The total amount of the treating liquid, including such diluent as may be used, is preferably between about 6 and 20 times the weight of the ligno-cellulosic material, but subject to this the amount of the unsaturated dicarboxylic acid or anhydride itself may be no more than equal to the weight of the material, though it is best that it should be at least twice this weight. The concentration of the unsaturated acid or anhydride in the treating liquid is preferably at least 10%.

Besides the unsaturated dicarboxylic acid or anhydride and any diluent, the treating liquid may contain quite small amounts of substances which exert an apparently catalytic action on the delignification of the cellulose in the ligno-cellulosic material. Examples of such substances are mineral acids, especially hydrochloric acid, and organic peroxides such, for example, as benzoyl peroxide. Such compounds may be present in amount about 2% or less of the unsaturated acid or anhydride, although higher proportions can be used if desired.

It is usually necessary to heat the ligno-cellulosic material with the treating liquid comprising the unsaturated acid or anhydride to a temperature above 80° C., and especially between 100° and 190° C., and we prefer to employ a treating liquid which boils under atmospheric pressure at or above the desired temperature. If desired, however, the treating liquid may normally boil at a lower temperature and be kept in the liquid phase by the use of pressure higher than atmospheric.

The time during which the treating liquid is allowed to act on the ligno-cellulosic material depends partly on the nature of whatever diluent may be present in admixture with the unsaturated acid or anhydride, and partly on the temperature to which the mixture is heated. For example, maleic acid diluted with acetic acid acts more rapidly than maleic acid diluted to the same extent with water and at the same temperature. Generally between 1 and 5 hours is sufficient at temperatures above about 110° C., while at lower temperatures longer time, e. g. up to 10 hours, may be necessary.

At the end of the treatment the treating liquor may be drained off or otherwise removed at a temperature not exceeding its boiling temperature, and the solid residue is preferably washed, e. g. with further quantities of a non-aqueous diluent when one has been employed in the treating liquor; washing with water may however be undesirable, as it may cause lignin to be reprecipitated.

The washed residue consists of more or less impure cellulose, and is preferably further purified by being treated with an alkaline solution. For example, it may be heated, preferably to a temperature above 70° C., with a caustic soda solution of concentration between 2 and 20% or higher; generally quite dilute solutions of concentration about 2 to 8% and especially 3 to 6% are very satisfactory. The material may, for example, be boiled with the alkaline solution under atmospheric pressure. The alkali treatment may be repeated 2, 3 or more times, and this often gives rise to a product of outstanding whiteness even in the absence of a bleaching operation. After the treatment the alkali may be run or filtered off or otherwise separated from the cellulose produced to as high a degree as may be convenient in any particular case, after which the cellulose may be washed free from alkali, e. g. with hot water or with a very dilute acetic or other acid. The washed cellulose may, if desired, be given a bleach or other supplementary purification treatment, but it is one of the advantages of the invention that even without such supplementary treatment a cellulose of a very useful degree of purity is obtained.

A large proportion of the lignin in the ligno-cellulosic material usually goes into solution in the treating liquid comprising the unsaturated dicarboxylic acid or anhydride, and it may be precipitated by neutralising the solution or by suitably diluting it. (The reaction of an anhydride with an alkali to form a salt of the corresponding acid is for the present purpose regarded as neutralisation.) For example, when a mixture of maleic or fumaric acid with acetic acid has been employed, the acetic acid may be removed by distillation, after which the maleic or fumaric acid may be diluted with water; when the treating liquid comprises a mixture of maleic anhydride and toluene or other aromatic hydrocarbon, the lignin may be precipitated by further diluting the anhydride with an aromatic hydrocarbon; benzene is particularly suitable for this purpose, as it can later be readily removed by distillation before using the mixture for the treatment of further ligno-cellulosic material. If desired, the lignin may be precipitated by evaporating off the unsaturated acid or anhydride, preferably under reduced pressure. It will be understood that, in accordance with the usual practice, the term "lignin" is used to include such high molecular weight conversion products as may be formed by the action of the treating agents on the ligno-cellulosic material.

Instead of removing the unsaturated dicarboxylic acid or anhydride from the treated ligno-cellulosic material in the liquid phase, it may be evaporated off, preferably under vacuum. In this case of course the lignin remains in the material, and it may be advantageous to employ for the alkali treatment a somewhat higher concentration of alkali than is otherwise necessary; preferably a caustic soda solution of concentration about 7-10 or 12% is used.

The invention is illustrated by the following examples:

*Example 1*

25 parts by weight of poplar chips were heated to 120° C. for 2½ hours with a mixture of 100 parts by weight of maleic anhydride and 100 parts by weight of acetic acid. The acid liquor was then run off and the chips washed first with acetic acid and then with water, after which the product was washed 3 times with hot 4% caustic soda solution and finally with hot water. The cellulose obtained had an alpha-cellulose content of 92% and a degree of polymerisation of 920, and was substantially white in colour.

*Example 2*

50 parts by weight of poplar chips were heated to 128° C. for 1½ hours with a mixture of 250 parts by weight of maleic acid and 250 parts by weight of acetic acid, after which they were washed and given an alkali treatment as described in Example 1, and finally washed with hot water. The cellulose obtained had an alpha-cellulose content of 95.4% and a degree of polymerisation of 830 and was almost pure white in colour.

The acetic acid washing liquor was added to the waste maleic acid liquor and the mixture was heated to distil off the acetic acid and was then diluted with water. Lignin was precipitated in amount about 20% of the weight of the wood.

*Example 3*

50 parts by weight of poplar chips were heated to 103° C. for 6 hours with a mixture of 250 parts by weight of maleic anhydride, 250 parts by weight of toluene, and 20 parts by weight of benzoyl peroxide. The maleic anhydride liquor was then run off, and the residue was washed with toluene and then given the alkali treatment described in Example 1 and washed with hot water.

The used maleic anhydride liquor was diluted with three times its weight of benzene; lignin was precipitated in amount about 20% of the weight of the wood, and was filtered off. The maleic anhydride/hydrocarbon mixture was then heated to distil off the benzene.

*Example 4*

Poplar chips were heated to 180° C. for 4 hours with 15 times their weight of undiluted maleic anhydride. The maleic anhydride was then evaporated off under vacuum, after which the chips were disintegrated and washed several times with a hot 8% caustic soda solution, until no more colour was extracted. The yield of cellulose so obtained was 37.5%; it was light cream in colour, and had an alpha-cellulose content of 93.6%.

*Example 5*

Poplar chips were heated to 180° C. for 4 hours with 12.5 times their weight of undiluted maleic anhydride. The maleic anhydride was then run off, and the chips washed successively with hot acetic acid, and hot water, disintegrated, and washed with hot 4% caustic soda solution until a cellulose of light cream colour remained.

*Example 6*

Poplar chips were boiled with 11 times their weight of a mixture of 6 parts by weight of maleic acid to 5 of acetic acid. After 1-5 hours the acid mixture was run off. The chips were then washed twice with hot acetic acid, disintegrated, and boiled several times with 4% aqueous caustic soda. The product was almost pure white, and had an alpha-cellulose content of 95.4%.

*Example 7*

Poplar chips were heated to 118° C. for 1-5 hours with 8 times their weight of maleic acid and twice their weight of water. The acid was run off and the chips washed first with acetic acid and then with water. They were then disintegrated and boiled several times with a 4% caustic soda solution. The product was again almost pure white.

Having described our invention, what we desire to secure by Letters Patent is:

1. Process for the production of cellulose from lignocellulosic material selected from the group consisting of woods and straws, which comprises heating the material to a temperature of 80°-190° C. with a liquid comprising 10-100% by weight of a compound selected from the group which consists of ethylenically unsaturated aliphatic dicarboxylic acids containing up to 7 carbon atoms in the molecule and cyclic anhydrides of such acids, freeing the material from the said compound, and heating the material with an aqueous caustic alkali solution of concentration 2-20% to a temperature between 70° C. and the boiling point of the solution.

2. Process according to claim 1, wherein the said compound contains 4 carbon atoms in the molecule.

3. Process according to claim 1, wherein the material is heated with the said liquid to 100°-190° C.

4. Process for the production of cellulose from lignocellulosic materials selected from the group consisting of woods and straws, which comprises heating the material to a temperature of 100°-190° C. with a liquid comprising 10-100% by weight of a compound selected from the group which consists of ethylenically unsaturated aliphatic dicarboxylic acids containing up to 7 carbon atoms in the molecule and cyclic anhydrides of such acids, freeing the material from the said compound, and heating the material with an aqueous caustic alkali solution of concentration 2-8% at a temperature of 70°-100° C.

5. Process for the production of cellulose from a lignocellulosic material selected from the group consisting of woods and straws, which comprises heating the material to a temperature of 100°-190° C. with a liquid comprising an ethylenically unsaturated aliphatic dicarboxylic acid containing 4 carbon atoms in the molecule in admixture with up to 9 times its weight of water, removing the dicarboxylic acid in the liquid phase from the material and heating the material to a temperature of 70°-100° C. with an aqueous caustic alkali solution of concentration 2 to 8%.

6. Process for the production of cellulose from lignocellulosic material selected from the group consisting of woods, and straws, which comprises heating the material to a temperature of 100°-190° C. with a liquid comprising an ethylenically unsaturated aliphatic dicarboxylic acid containing 4 carbon atoms in the molecule in admixture with up to 9 times its weight of acetic acid, removing the dicarboxylic acid in the liquid phase from the material and heating the material to a temperature of 70°-100° C. with an aqueous caustic alkali solution of concentration 2 to 8%.

7. Process for the production of cellulose from lignocellulosic material selected from the group consisting of woods and straws, which comprises heating the material to a temperature of 100°-190° C. with a liquid comprising maleic anhydride in admixture with up to 9 times its weight of acetic acid, removing the maleic anhydride in the liquid phase from the material and heating the material to a temperature of 70°–100° C. with an aqueous caustic alkali solution of concentration 2 to 8%.

8. Process for the production of cellulose from lignocellulosic material selected from the group consisting of woods and straws, which comprises heating the material to a temperature of 100°–190° C. with a liquid comprising maleic anhydride in admixture with up to 9 times its weight of a liquid aromatic hydrocarbon, removing the maleic anhydride in the liquid phase from the material and heating the material to a temperature of 70°–100° C. with an aqueous caustic alkali solution of concentration 2 to 8%.

9. Process for the production of cellulose from lignocellulosic material selected from the group consisting of woods and straws, which comprises heating the material to a temperature of 80°–190° C. with a liquid comprising 10–100% by weight of a compound selected from the group which consists of ethylenically unsaturated aliphatic dicarboxylic acids containing up to 7 carbon atoms in the molecule and cyclic anhydrides of such acids, freeing the material from the said compound by evaporation, and heating the material with an aqueous caustic alkali solution of concentration 7–12% to a temperature of 70–100° C.

References Cited in the file of this patent

UNITED STATES PATENTS

| Number | Name | Date |
|---|---|---|
| 1,509,273 | Ehrenthal | Sept. 23, 1924 |
| 1,705,424 | Strecker | Mar. 12, 1929 |
| 1,923,292 | Bassett | Aug. 22, 1933 |
| 2,022,654 | Dreyfus | Dec. 3, 1935 |
| 2,024,689 | Groombridge | Dec. 17, 1935 |
| 2,156,160 | Olson et al. | Apr. 25, 1939 |
| 2,308,564 | McKee | Jan. 19, 1943 |
| 2,385,955 | Tomlinson | Oct. 2, 1945 |
| 2,538,742 | Willey | Jan. 16, 1951 |

FOREIGN PATENTS

| 881,281 | France | Apr. 20, 1943 |
|---|---|---|

OTHER REFERENCES

Cellulose and Cellulose Derivatives, by Ott, published by Inter-Science Publishers, Inc., New York (1943), p. 274.

Lewis et al.: Ind. and Eng. Chem., October 1943, pp. 1113–1116.